United States Patent [19]

Siwersson et al.

[11] Patent Number: 4,603,774
[45] Date of Patent: * Aug. 5, 1986

[54] VERTICAL CONVEYOR FOR BULK GOODS

[75] Inventors: Olle L. Siwersson, Helsingborg; Arne E. Wall, Landskrona, both of Sweden

[73] Assignee: AB Scaniainventor, Helsingborg, Sweden

[ * ] Notice: The portion of the term of this patent subsequent to Aug. 28, 2001 has been disclaimed.

[21] Appl. No.: 631,184

[22] Filed: Jul. 16, 1984

Related U.S. Application Data

[63] Continuation-in-part of Ser. No. 323,796, Nov. 23, 1981, Pat. No. 4,467,910.

[30] Foreign Application Priority Data

Nov. 28, 1980 [SE] Sweden ................................ 8008347

[51] Int. Cl.4 ............................................. B65G 65/16
[52] U.S. Cl. .................................... 198/518; 198/658; 198/671
[58] Field of Search ............... 198/518, 674, 658, 511, 198/513, 671, 626; 414/144

[56] References Cited

U.S. PATENT DOCUMENTS

| 2,224,991 | 12/1940 | Schweickart et al. | 198/674 |
| 3,269,527 | 8/1966 | Denham | 198/674 |
| 3,568,819 | 3/1971 | Mann | 198/674 X |
| 3,685,638 | 8/1972 | Siwersson et al. | 198/608 |
| 4,017,241 | 4/1977 | Papinchak et al. | 198/657 X |
| 4,230,221 | 10/1980 | Beresinsky | 198/518 X |
| 4,343,394 | 8/1982 | Emmert et al. | 198/658 X |
| 4,467,910 | 8/1984 | Siwersson et al. | 198/518 |

FOREIGN PATENT DOCUMENTS 1148489 5/1963 Fed. Rep. of Germany ...... 198/658

Primary Examiner—Leslie J. Paperner
Assistant Examiner—Jonathan D. Holmes
Attorney, Agent, or Firm—Sheridan Neimark

[57] ABSTRACT

Use is made of a screw conveyor to supply and guide bulk material to a belt conveyor of the type having two or more belts which travel in face-to-face relationship and between which the bulk material is enclosed during conveyance. The screw of the screw conveyor is rotatably mounted for rotation about its axis and has its upper end in immediate proximity to the entrance end of the belt conveyor. The tubular outer housing of the screw conveyor is rigidly connected to the frame of the belt conveyor. A material supply device is provided at the entrance opening of the screw conveyor.

10 Claims, 13 Drawing Figures

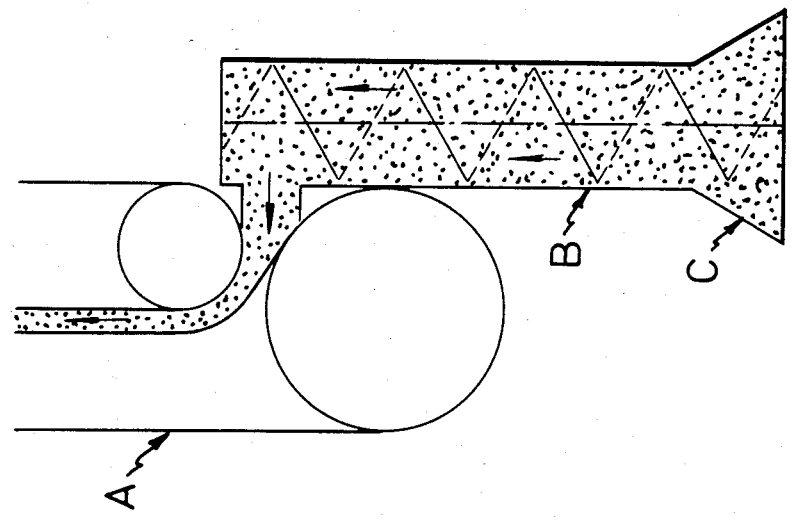
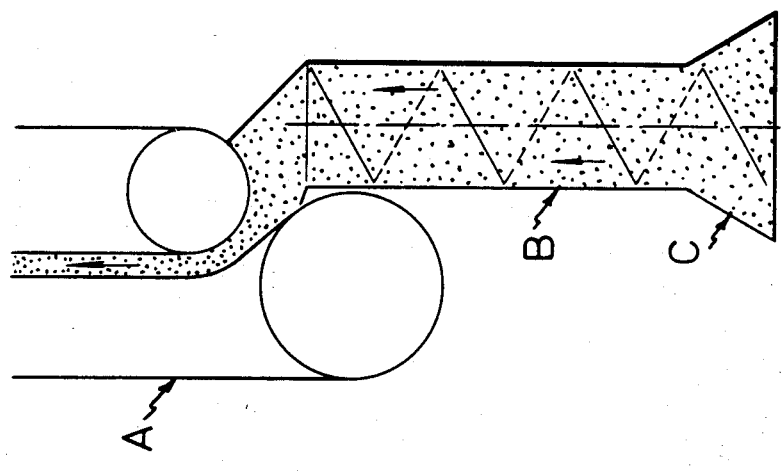
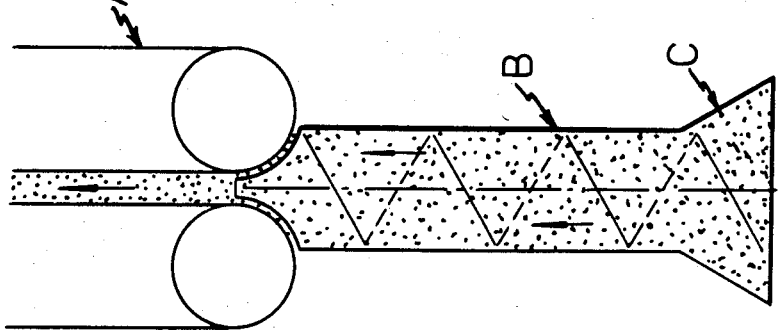

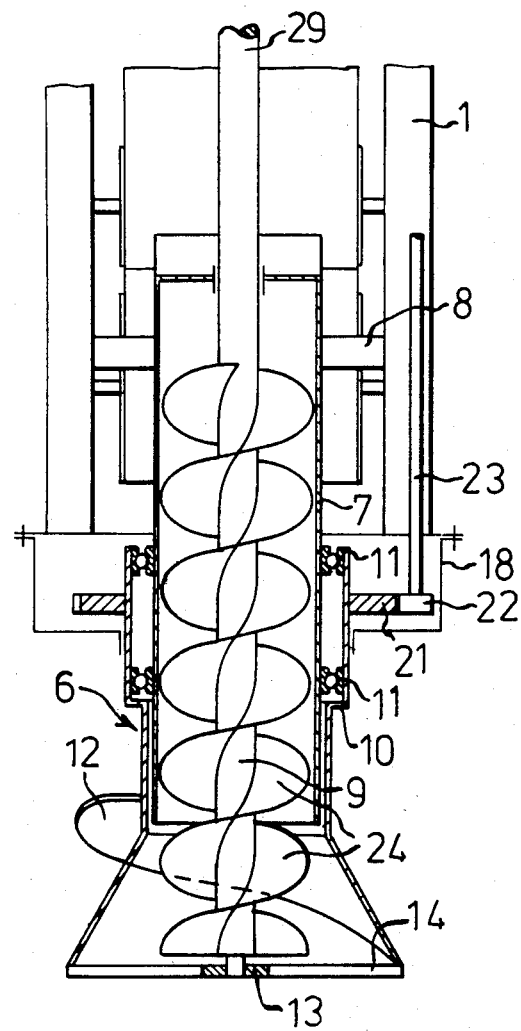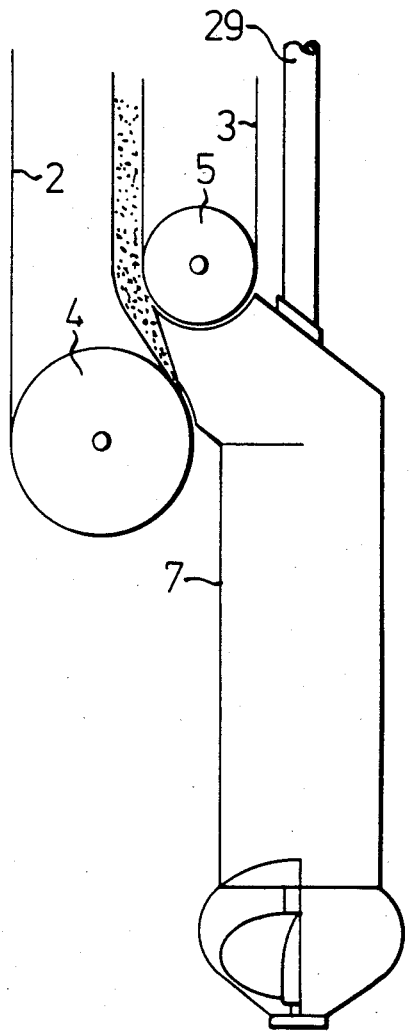
FIG. 7A
FIG. 7B

VERTICAL CONVEYOR FOR BULK GOODS

CROSS-REFERENCE TO RELATED APPLICATION

This application is a continuation-in-part of our copending U.S. application Ser. No. 323,796, filed on Nov. 23, 1981, now U.S. Pat. No. 4,467,910.

BACKGROUND OF THE INVENTION

This invention relates generally to conveyors for bulk material and more particularly to a conveyor of this type which comprises a belt conveyor forming a tube in which the bulk material is conveyed in an upward direction from an entrance end at a lower portion of the belt conveyor.

Conveyors having double conveyor belts which over at least part of their extension are in face-to-face relationship and travel in unison, are advantageous for providing rapid and closed conveyance of bulk material over conveyance paths of both vertical and horizontal extension. This type of belt conveyors is disclosed for instance in U.S. Pat. Nos. 3,319,776 to G. Bechtloff et al and 3,618,746 to P. D. Suloff. In the belt conveyors described and shown in these patent specifications the material is supplied to a horizontal section of one belt. As a result, the arrangement will necessarily be relatively bulky at the point of supply, for which reason a belt conveyor of such a design is not suited as a vertical conveyor, especially not in narrow premises.

Further, it is previously known from U.S. Pat. No. 4,230,221 to Isaac Beresinsky to use for the supply of bulk material to a vertical belt conveyor a vane wheel which throws the material in between the belts of the belt conveyor. Said vane wheel does not operate directly in the bulk material depot, from which vertical conveyance is to be effected, but receives the bulk material either directly from a horizontally extending screw conveyor or via a vertically extending screw conveyor which delivers the bulk material to a bin from where the vane wheel throws it into the entrance end of the belt conveyor. In these cases also the conveyor requires relatively ample room at the entrance end and moreover the material changes its direction of motion at the entrance point. In the case of a horizontal screw conveyor the motional pattern of the entrance end is restricted to directions transversely of the longitudinal axis of the screw conveyor.

For the conveyance of bulk material from narrow premises it would be desirable if the material could be supplied directly to a downwardly directed end of a belt conveyor of the above-mentioned type, which necessitates that the flow of material is moved with a certain force up to the belt conveyor end for further upward conveyance.

SUMMARY

The main object of the present invention therefore is to provide a conveyor of the type described in the introduction, which produces a rapid supply of the material, is compact and movable in all directions for supplying material from optional sides.

This and further objects of the invention are attained by means of a bulk material conveyor which comprises a belt conveyor forming a tube and preferably having belts which travel in face-to-face relationship and between which the bulk material is conveyed in an upward direction from an entrance end at a lower portion of the belt conveyor, said bulk material conveyor having a downwardly directed screw conveyor which is fixedly mounted at the lower portion of the belt conveyor and the delivery opening of which connects directly onto the entrance end between said belts while the entrance opening of the screw conveyor is equipped with a material supplying device.

The invention thus provides a bulk material conveyor which is extremely compact, permits supply of material from optional sides and is movable in all directions. The use of a screw conveyor having a material supplying device allows a high supplying speed for the bulk material from the bulk material depot to the belt conveyor in that the screw conveyor can operate at a high rpm and with a high volumetric efficiency. The direct coupling between the screw conveyor and the belt conveyor brings the advantage that the direction of motion of the material need not essentially be changed when the material passes from the screw conveyor to the belt conveyor. The screw conveyor makes it also possible to deliver the bulk material in a concentrated stream which can be supplied to the center between the belts of the belt conveyor so that the marginal portions of the belts will be free of the conveyed material.

BRIEF DESCRIPTION OF THE DRAWINGS

FIGS. 1, 2 and 3 illustrate the principle of the invention in three different embodiments;

FIGS. 5A and 5B, 6A and 6B, 7A and 7B and 8A and 8B diagrammatically show longitudinal sections of second to fifth embodiments of the conveyor according to the invention.

DESCRIPTION OF THE PREFERRED EMBODIMENTS

Figure 4A:
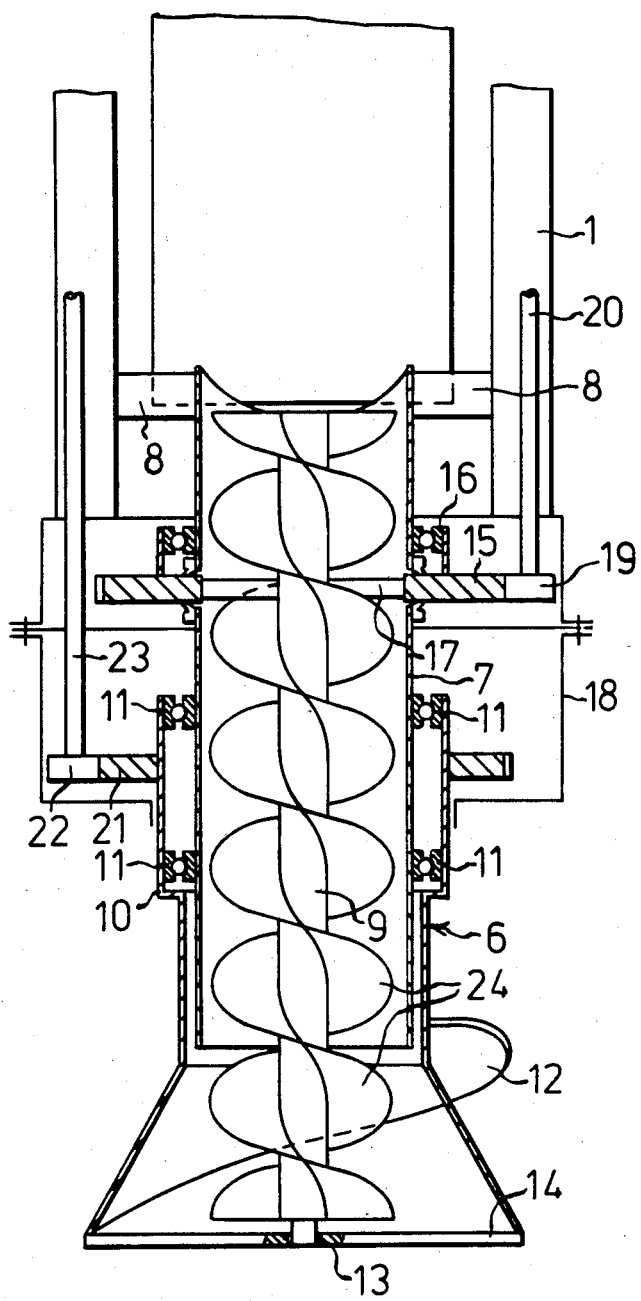
FIGS. 4A and 4B diagrammatically show longitudinal sections, taken at right angles to each other, of a first embodiment of a vertical conveyor according to the invention.

As diagrammatically shown in FIGS. 1, 2 and 3 a bulk material conveyor according to the present invention comprises a belt conveyor A having two belts travelling in face-to-face relationship, and a vertically arranged screw conveyor assembly B which at the lower end is equipped with a material supplying device C. At the lower end or entrance end of the belt conveyor A the belts thereof are passed about two drums which according to FIG. 1 may be placed on the same level, according to FIG. 2 may be placed obliquely over one another, and according to FIG. 3 may be placed substantially vertically over one another. For realizing the direct coupling, aimed at by the invention, between the screw conveyor B and the belt conveyor A, the screw conveyor B is mounted in the embodiment according to FIG. 1 vertically below the belt conveyor A and centrally in relation thereto. In the case of FIG. 2 the axis of the screw conveyor is laterally offset relative to the axis of the belt conveyor A. The axis of the screw conveyor B may here lie altogether outside the belt conveyor A so that an upwardly directed drive shaft of the screw conveyor B goes free of the belt conveyor A. In the embodiment according to FIG. 3 the flow of material is led substantially horizontally outwards from the delivery opening of the screw conveyor into the entrance opening of the belt conveyor A, which opening is arranged substantially at a right angle to the flow of material.

For a meaningful combination of the belt conveyor A and the screw conveyor B it is required that the conveying capacity of the screw conveyor reasonably corresponds to that of the belt conveyor. This in turn requires that the screw conveyor B operates with a high volumetric efficiency, for which reason some form of device C for suppling material to the screw conveyor B is necessary. Material suppling devices of the type described in U.S. Pat. Nos. 3,596,751 and 3,685,638 (both to O. L. Siwersson and K. G. Tell), are preferred. Said patents are hereby incorporated by reference.

When the screw conveyor B and belt conveyor A are coupled together, due attention should be paid to the motional pattern of the material in the screw conveyor B. The screw of said conveyor B imparts to the material an upward-outward movement which has axial, radial and tangential components. In view hereof, the embodiment according to FIG. 2 will give the smallest losses as a result of the change of direction of the flow of material at the transition from the screw conveyor B to the belt conveyor A. In the embodiment according to FIG. 3 the screw conveyor B should be placed slightly offset to the central plane of the lower drums of the belt conveyor A. In all of these embodiments the belt conveyor A can also to advantage be combined with two screw conveyors B each of which is placed on one side of said central plane and in which the flow of material has opposite directions of rotation so that the bulk material is supplied in the centre between the belts of the belt conveyor A.

Figure 4B:
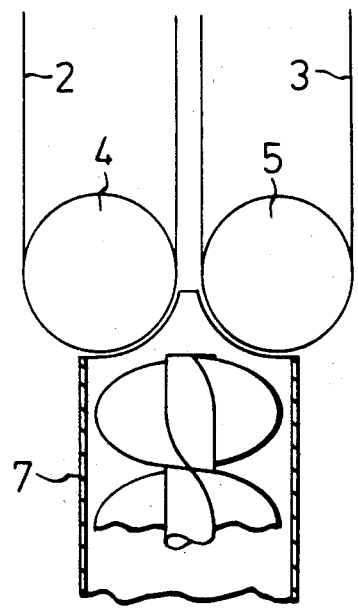

FIGS. 4A and 4B show an embodiment of the bulk material conveyor according to FIG. 1. A vertically extending belt conveyor has a frame 1 and two belts 2, 3. The upper portion of the frame 1 may be suspended in substantially the same manner as the vertical conveyor in Swedish Pat. No. 377,099 and the belt conveyor may have a substantially horizontally extending section or be connected to a separate horizontal conveyor. The belt conveyor is of the type having two belts 2, 3 which travel in face-to-face relationship and between which bulk material can be conveyed and kept enclosed in per se known manner. The entrance end of the belt conveyor is the gap between two drums 4, 5 which are mounted for rotation in the frame 1 and over which the belts 2 and 3 travel.

Although all of the embodiments of the bulk material conveyor according to the invention here described and illustrated in the drawings make use of a belt conveyor having two belts, it will be appreciated that the invention is not restricted to belt conveyors with this number of belts, but is applicable just as well to belt conveyors having three or more belts, and also to belt conveyors having but a single belt.

A screw conveyor 6 is mounted in the frame 1 immediately beneath the drums 4, 5 of the belt conveyor to serve as a means for guiding or supplying bulk material between the two conveyor belts 2 and 3. More particularly, the housing 7 of the screw conveyor 6 is rigidly connected to the frame 1 of the belt conveyor by means of cross-bars 8, and its upper end edge is of a shape conforming to the shape of the belts 2, 3 on the belt drums 4, 5 located directly above. The screw 9 of the screw conveyor is rotatably mounted in the housing 7. On a cylinder 10 which encloses the lower portion of the housing 7 and which is rotatably mounted on the housing 7 by means of bearings 11, an external guide surface 12 is mounted which is positioned at the lower end of the screw 9 and is in the form of a helically or spirally coiled vane which is adapted to guide or supply material towards the entrance end of the screw conveyor. The screw 9 and the cylinder 10 are rotatably interconnected by means of a bearing 13 provided in one or two transverse bars 14 rigidly connected to the lower end of the cylinder 10.

A gear rim 15 is rotatably mounted by means of a bearing 16 on the housing 7 and is rigidly connected to the screw 9 by means of spokes 17. The inner side of the gear rim 15 here forms a transition between an upper and a lower portion of the housing 7, of which the upper portion is fixedly mounted in an outer housing 18 rigidly connected to the frame 1. The gear rim 15 meshes with a pinion 19 on a drive shaft 20 which extends in an upward direction along the belt conveyor and is driven by a motor (not shown) spaced from the entrance end of the belt conveyor.

A second gear rim 21 is mounted on the periphery of the cylinder 10 and meshes with a second pinion 22 on the drive shaft 23 which also extends in an upward direction along the belt conveyor and is driven by a motor (not shown) spaced from the entrance end of the belt conveyor.

The screw 9 illustrated in the drawings has two screw blades or vanes 24, and the centre axis of the screw is positioned, in the axial direction, centrally between the lower drums 4, 5 of the belt conveyor. Naturally, also a screw having a single screw vane may be used, in which case the conveyor screw 9 preferably is laterally offset in the axial direction relative to the lower drums 4, 5 of the belt conveyor.

The arrangement according to the invention makes it possible to provide the discharge end of the screw conveyor immediately adjacent the entrance end of the belt conveyor, whereby sufficient kinetic energy can be imparted to the material discharged by the screw conveyor to cause the material to be gripped between the two opposing belts 2, 3 in the gap between the drums 4, 5. The arrangement according to the invention is of simple construction and provides a vertical conveyor which requires but little space and which may be mounted on the lower end of a crane jib, in the same manner as the conveyor according to Swedish Pat. No. 377,099. The attributes "vertical" and "horizontal" employed in the foregoing and in the following must, of course, not be considered to exclude positions or conveying directions which are offset from the vertical and the horizontal, respectively.

Figure 5A:
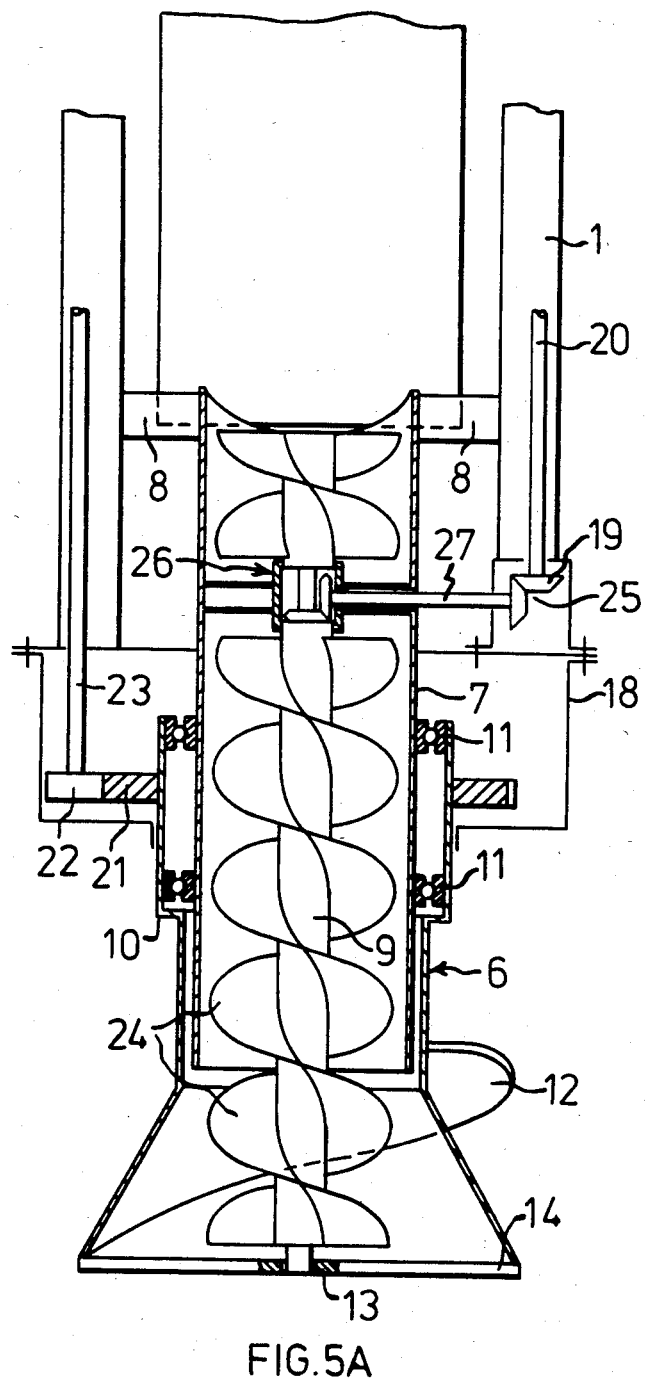
Figure 5B:
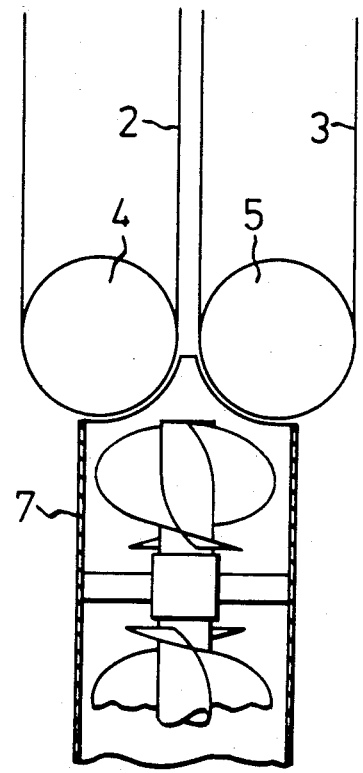
Figure 6A:
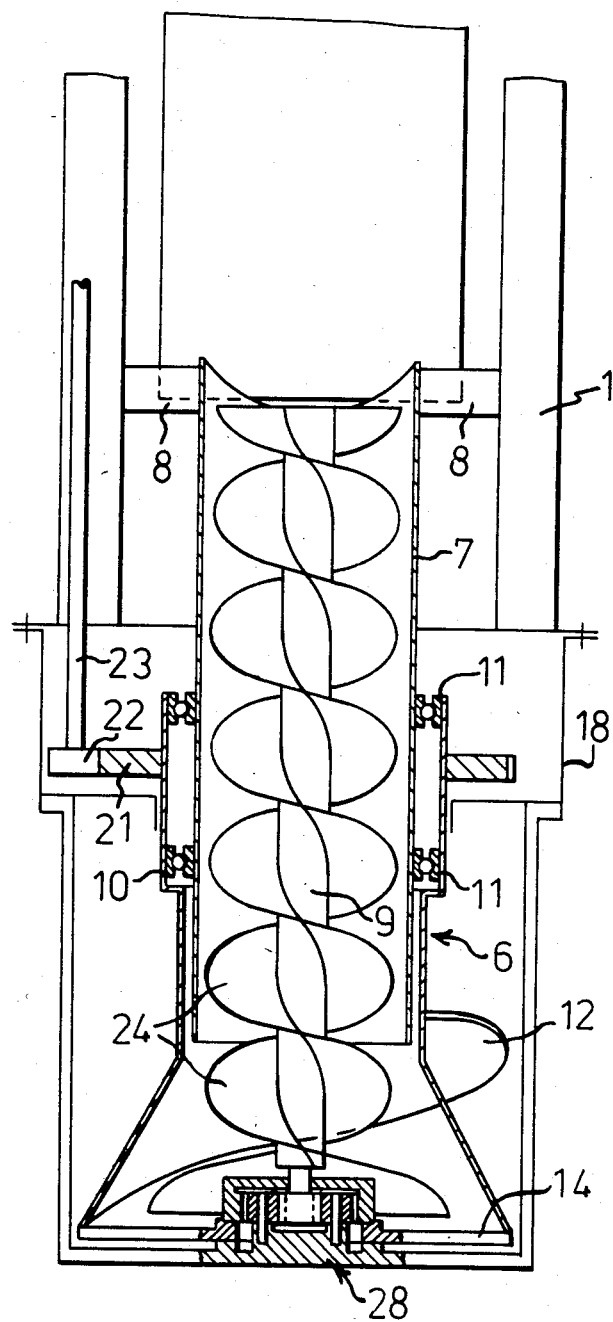
Figure 6B:
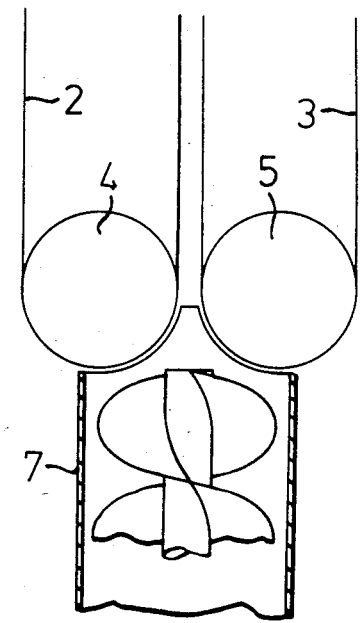

As will be appreciated by those skilled in the art, several modifications of the embodiment described above are conceivable. In a variant shown in FIGS. 5A and 5B, the screw 9 thus is driven via two angular gears 25 and 26 and an intermediate shaft 27, the pinion 19 being the input pinion of the angular gear 25. According to a variant shown in FIGS. 6A and 6B, the screw 9 is driven via the drive shaft 23, the pinion 22, the gear rim 21 and the cylinder 10 in that an epicyclic gear 28 is provided for connecting together the lower end of the screw 9, which is fixedly connected to the sun gear, the cylinder 10 whose transverse bars 14 are fixedly connected to the gear rim of the epicyclic gear 28, and the outer housing which, via a frame structure, supports the planet gear carrier with the planet gears.

FIGS. 7A and 7B show an embodiment of the bulk material conveyor according to FIG. 2. For the components occurring also in the embodiment according to FIGS. 4A and 4B, like reference numerals are used. In this case, the screw conveyor is laterally offset relative to the belt conveyor, such that the centre axis of the screw 9 in its upward extension extends laterally of the nearest belt 3. The screw 9 thus is driven via a drive shaft 29 which is a direct extension of the screw 9 itself.

Figure 8A:
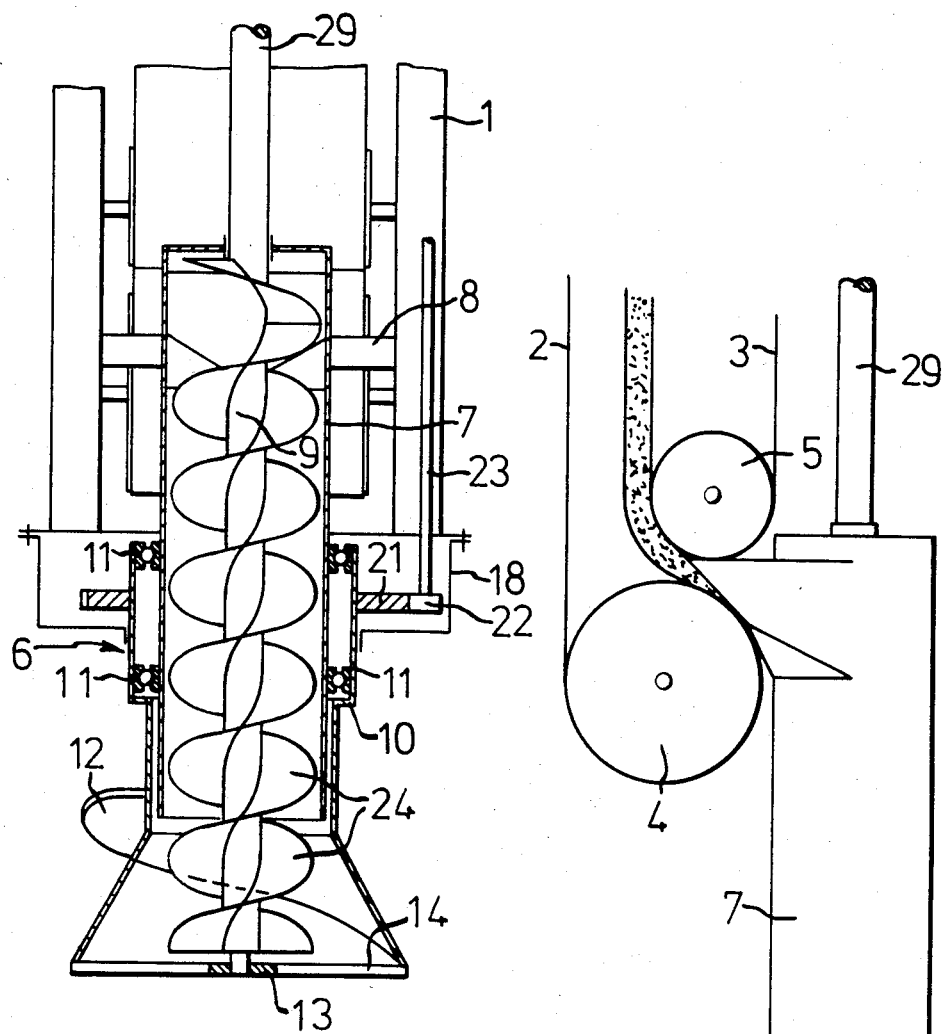
Figure 8B:
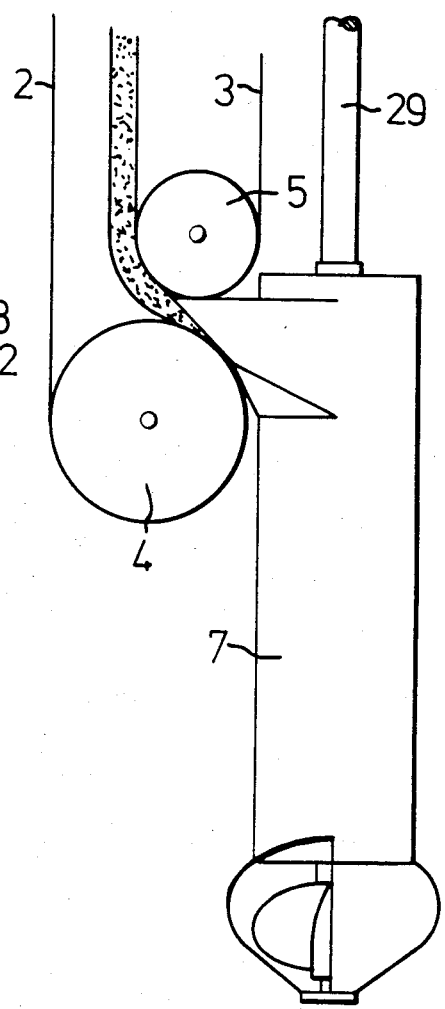

Finally, FIGS. 8A and 8B show an embodiment of the bulk material conveyor according to FIG. 3. Again, the components occurring in the embodiment according to FIGS. 4A and 4B are identified by like reference numerals. This bulk material conveyor corresponds to the one shown in FIGS. 7A and 7B, with the sole exception that the housing 7 and the screw 9 extend farther upwards so that the conveyed material will be flung in a more horizontal direction into the gap between the belts 2, 3 where these travel around the drums 4, 5 mounted almost vertically above one another.

Finally, it should be stressed that the screw 9 and the material supplying device 12 need not be driven via mechanical drive shafts but may, alternatively, be operated hydraulically or by other means.

What we claim and desire to secure by Letters Patent is:

1. A bulk material conveyor comprising a belt conveyor forming a tube in which the bulk material is conveyed in an upward direction from an entrance end at a lower portion of the belt conveyor, a downwardly directed screw conveyor fixedly mounted on the lower portion of the belt conveyor, said screw conveyor having its delivery opening directly connected onto the entrance end of said tube, and a material supplying device at the entrance opening of said screw conveyor, wherein a housing of said screw conveyor is rigidly connected to a frame of said belt conveyor, wherein a screw of said screw conveyor is rotatably mounted, and wherein a pinion is driven by a motor spaced from the entrance end of said belt conveyor for rotating gear means connected to the screw of said screw conveyor.

2. Conveyor as claimed in claim 1, wherein said belt conveyor has two belts in face-to-face relationship.

3. Conveyor as claimed in claim 2, wherein said screw conveyor is mounted as an extension of said belt conveyor substantially in parallel with the lower portion thereof.

4. Conveyor as claimed in claim 2, wherein said belt conveyor has an entrance opening between said belts at right angles to the conveying direction of the bulk material from the entrance end of said belt conveyor.

5. Conveyor as claimed in claim 2, wherein the entrance opening of said belt conveyor is obliquely positioned relative or substantially parallel to the conveying direction of the bulk material from the entrance end of said belt conveyor.

6. Conveyor as claimed in claim 2, wherein the gear means comprises an annular gear rim with which said pinion meshes and which is rigidly connected to the screw of said screw conveyor.

7. Conveyor as claimed in claim 2, wherein the gear means comprises an angular gear driven by said pinion.

8. Conveyor as claimed in claim 2, wherein the gear means comprises an epicyclic gear driven by said pinion which also drives said material supplying device via an annular gear rim.

9. A bulk material conveyor comprising a belt conveyor forming a tube in which the bulk material is conveyed in an upward direction from an entrance end at a lower portion of the belt conveyor, a downwardly directed screw conveyor fixedly mounted on the lower portion of the belt conveyor, said screw conveyor having its delivery opening directly connected onto the entrance end of said tube, and a material supplying device at the entrance opening of said screw conveyor, wherein a housing of said screw conveyor is rigidly connected to a frame of said belt conveyor with its centre axis laterally offset from the longitudinal centre axis of said belt conveyor, and wherein a screw of said screw conveyor is rotatably mounted and connected to a drive shaft extending parallel to the longitudinal centre axis of said belt conveyor.

10. Conveyor as claimed in claim 9, wherein said belt conveyor has two belts in face-to-face relationship.

* * * * *